(12) United States Patent
Choi (10) Patent No.: US 7,702,356 B2
(45) Date of Patent: Apr. 20, 2010

(54) KEYPAD ASSEMBLY FOR MOBILE STATION

(75) Inventor: Cheal-Hoon Choi, Incheon (KR)

(73) Assignee: LG Electronics Inc., Seoul (KR)

( * ) Notice: Subject to any disclaimer, the term of this patent is extended or adjusted under 35 U.S.C. 154(b) by 342 days.

(21) Appl. No.: 11/230,974

(22) Filed: Sep. 20, 2005

(65) Prior Publication Data

US 2006/0062624 A1    Mar. 23, 2006

(30) Foreign Application Priority Data

Sep. 20, 2004 (KR) ............... 10-2004-0075225
Sep. 20, 2004 (KR) ............... 10-2004-0075226
Sep. 20, 2004 (KR) ............... 10-2004-0075227
Oct. 26, 2004 (KR) ............... 10-2004-0085936

(51) Int. Cl.
*H04M 1/00* (2006.01)

(52) U.S. Cl. ............. 455/550.1; 455/575.1; 455/575.2; 455/575.3; 455/575.4; 455/575.5; 455/575.6; 455/575.7; 455/575.8; 455/575.9; 345/168; 345/169; 345/170; 345/171; 345/172

(58) Field of Classification Search ......... 455/550.1, 455/575.1, 575.2, 575.3, 575.4, 575.5, 575.6, 455/575.7, 575.8, 575.9, 90.1, 90.2, 90.3; 345/168, 169, 170, 171, 172

See application file for complete search history.

(56) References Cited

U.S. PATENT DOCUMENTS

| | | | | |
|---|---|---|---|---|
| 5,612,690 A | * | 3/1997 | Levy ............... | 341/22 |
| 5,861,823 A | * | 1/1999 | Strauch et al. ........ | 341/22 |
| 5,867,772 A | * | 2/1999 | Jonsson et al. ........ | 455/575.1 |
| 6,377,685 B1 | * | 4/2002 | Krishnan ............. | 379/433.07 |
| 2002/0025837 A1 | * | 2/2002 | Levy ............... | 455/566 |
| 2004/0031673 A1 | * | 2/2004 | Levy ............... | 200/521 |
| 2005/0231486 A1 | * | 10/2005 | Wiggeshoff .......... | 345/168 |

FOREIGN PATENT DOCUMENTS

| | | |
|---|---|---|
| CN | 1439164 | 8/2003 |
| GB | 2353762 | 3/2001 |
| JP | 2002-535789 A | 10/2002 |
| KR | 1994-0001685 | 1/1994 |
| KR | 1020000046613 A | 7/2000 |
| KR | 1020010090135 A | 10/2001 |
| WO | WO 0044014 | 7/2000 |
| WO | WO 01/95358 A2 | 12/2001 |
| WO | WO 01/95358 A3 | 12/2001 |
| WO | WO 03086957 | 10/2003 |
| WO | WO 2004/023504 | 3/2004 |

* cited by examiner

*Primary Examiner*—Lana N Le
*Assistant Examiner*—Ping Y Hsieh
(74) *Attorney, Agent, or Firm*—Lee, Hong, Degerman, Kang and Waimey

(57) ABSTRACT

A keypad assembly for a mobile station comprises a base pad adapted to support a plurality of keys, the plurality of keys comprising a plurality of first keys and a plurality of second keys. The keypad assembly also comprises the plurality of first keys and the plurality of second keys arranged on the base pad, the plurality of second keys defined by horizontal center lines and vertical center lines of the plurality of first keys. The plurality of second keys may be further defined by outer perimeters of the plurality of first keys. The keypad assembly may further comprise a strength reinforcing plate coupled to the base pad, adapted to mechanically strengthen the keypad assembly. An alphabetic character may be assigned to each of the plurality of first keys. A numeral may be assigned to at least one of the plurality of second keys.

18 Claims, 12 Drawing Sheets

KEYPAD ASSEMBLY FOR MOBILE STATION

CROSS-REFERENCE TO RELATED APPLICATIONS

Pursuant to 35 U.S.C. § 119(a), this application claims the benefit of earlier filing date and right of priority to Korean Application No. 2004-0075225, filed on Sep. 20, 2004, Korean Application No. 2004-0075226, filed on Sep. 20, 2004, Korean Application No. 2004-0075227, filed on Sep. 20, 2004, and Korean Application No. 2004-0085936, filed on Oct. 26, 2004, the contents of which are hereby incorporated by reference herein in their entirety.

FIELD OF THE INVENTION

The present invention relates generally to a mobile station and, more particularly, to a keypad assembly for a mobile station.

BACKGROUND OF THE INVENTION

Mobile stations enable wireless communications between parties. Mobile stations may perform various functions such as transmitting/receiving a text message, accessing the Internet, enabling television viewing, photographing still or moving images and transmitting the images to another party, as well as conventional voice calling. Several types of mobile stations exist, such as bar type, flip type, folding type, and slide type.

Figure 1:
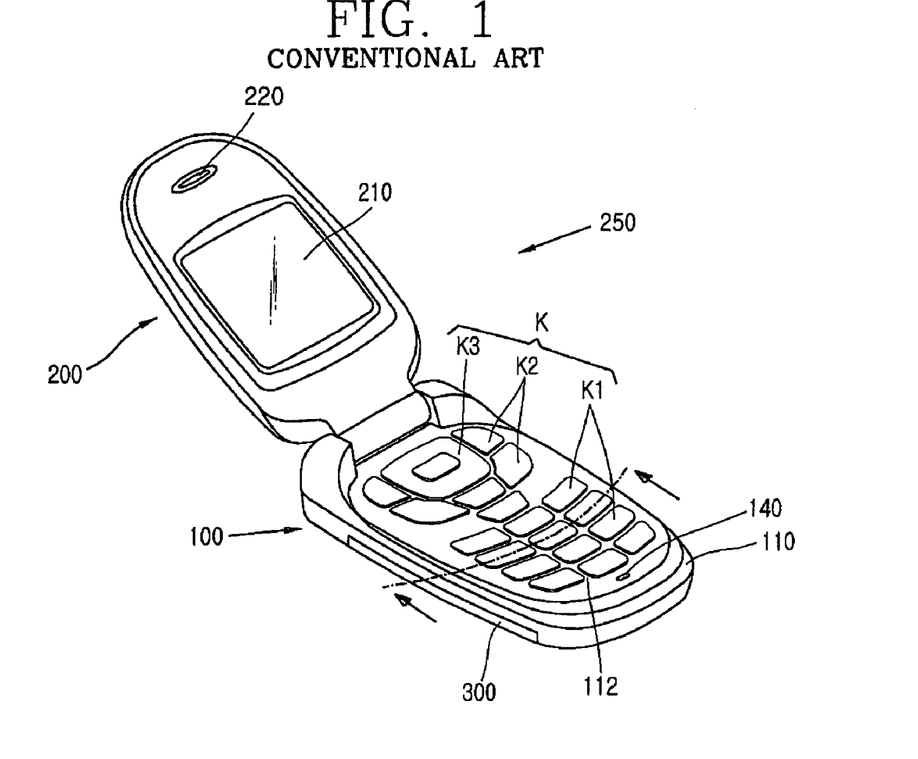
FIG. 1 is a diagram illustrating a perspective view of a folding type mobile station.
Figure 2:
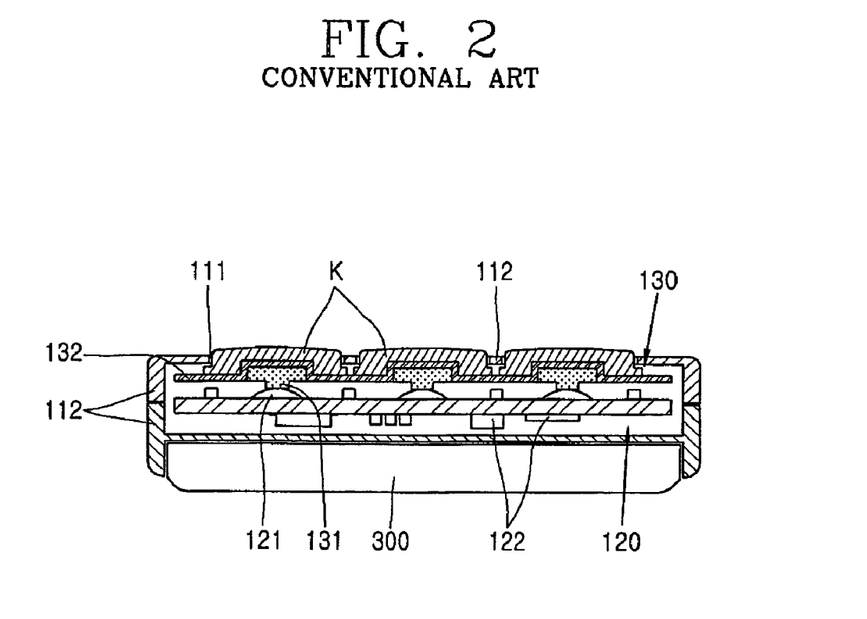
FIG. 2 is a diagram illustrating a lateral section view of a folding type mobile station.

FIG. 1 is a diagram illustrating a perspective view of a folding type mobile station 250. FIG. 2 is a diagram illustrating a lateral section view of the folding type mobile station 250.

Referring to FIGS. 1 and 2, the folding type mobile station 250 includes a mobile station body 100, a folder 200 that is hinge-coupled to one side of the mobile station body 100, and a battery 300 mounted to the mobile station body 100.

The mobile station body 100 includes a body casing 110, a main board 120, mounted in the body casing 110 having a plurality of dome switches 121 at one side thereof and a plurality of components 122 at another side thereof. The mobile station body 100 also includes a keypad 130 having a plurality of keys K. The keypad 130 is mounted in the body casing 110 such that the keys K protrude to an upper surface of the body casing 110.

The keypad 130 includes a pad 132 with a plurality of protrusions 131 at one surface thereof and a plurality of keys K attached to another surface of thereof. The keys K include general keys K1 displaying numbers and/or characters, adjustment keys K2 displaying functions, and a multi-key K3. The general keys K1 are arranged at a lower region of the pad 132 to have rows and columns in horizontal and vertical directions, respectively, and the adjustment keys K2 and the multi-key K3 are arranged at an upper region of the pad 132. The keys K are positioned to correspond to the protrusions 131 provided at the other surface of the pad 132. Furthermore, the dome switches 121 of the main board 120 are arranged to correspond to the protrusions 131 of the keypad 130.

Key holes 111 that have shapes corresponding to shapes of the keys K are formed at an upper surface of the body casing 110. The keypad 130 protrudes from the upper surface of the body casing 110 such that the keys K are inserted into the key holes 111. The protrusions 131 of the keypad 130 respectively contact the dome switches 121 of the main board 120. The folder 200 also includes a display 210. Furthermore, reference numerals 140 and 220 denote a microphone and a speaker, respectively.

In the folding type mobile station 250, when a call is received from another party, the adjustment key K2 is pressed to execute the call. Furthermore, to initiate a call to another party, the general keys K1 are pressed to input a phone number and the adjustment key K2 is pressed to execute the call. To access the Internet or send a text message using the folding type mobile station 250, the keys K are also used.

As the size of folding type mobile station decreases, useable area where the keys K may be arranged is also decreasing. To compound the problem, more functions requiring use of the keypad are being added. As a result, multiple characters and/or functions are assigned to a single key, making for more complicated operation by the user.

In the conventional folding type mobile station 250, the plural key holes 111 are formed in the body casing 110 and the keys K are inserted through the key holes 111 of the body casing 110 to protrude to the outside of the body casing 110. Accordingly, a space exists between the key holes 111. Therefore, the number of the keys K that may be arranged on the body casing 110 is reduced. However, if the space between the key holes 111 is reduced to increase the number of the keys K, the structural integrity of the frame 112 of the body casing 110 may be weakened.

SUMMARY OF THE INVENTION

Accordingly, the present invention is directed to a keypad assembly for a mobile station that substantially obviates one or more problems due to limitations and disadvantages of the related art.

An object of the present invention is to provide a keypad assembly having increased structural integrity and with capacity for arrangement of many keys.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a keypad assembly for a mobile station comprises a base pad adapted to support a plurality of keys, the plurality of keys comprising a plurality of first keys and a plurality of second keys. The keypad assembly also comprises the plurality of first keys and the plurality of second keys arranged on the base pad, the plurality of second keys defined by horizontal center lines and vertical center lines of the plurality of first keys.

The plurality of second keys may be further defined by outer perimeters of the plurality of first keys. An alphabetic character may be assigned to each of the plurality of first keys. A numeral may be assigned to at least one of the plurality of second keys.

The keypad assembly may further comprise a strength reinforcing plate coupled to the base pad, adapted to mechanically strengthen the keypad assembly. The strength reinforcing plate may be positioned between the base pad and the plurality of second keys. The strength reinforcing plate may comprise a plurality of assembly holes at an edge thereof, and a plurality of through holes to house a first key of the plurality of first keys and a second key of the plurality of second keys. The strength reinforcing plate may be formed of metal.

At least one of the plurality of first keys may have a horizontal circular surface and wherein four edges of at least one of the plurality of second keys are curved surfaces that correspond to a curvature of at least one of the plurality of first keys. A height of the plurality of first keys may be different from a height of the plurality of second keys. The base pad may comprise contact protrusions at one surface thereof, adapted to correspond to the plurality of first keys. The plurality of first keys may be integrally formed with the base pad. The plurality of first keys may be formed of a transparent material.

The keypad assembly may further comprise key supporting protrusions formed on the base pad, having a height adapted to correspond to the plurality of second keys, wherein the plurality of second keys are respectively attached to the key supporting protrusions. The base pad may further comprise slits adapted to prevent overlap between the plurality of first keys and the plurality of second keys. The base pad may be formed of polyurethane. The base pad may further comprise adjustment keys spaced apart from the plurality of first keys and the plurality of second keys.

In another embodiment, a mobile station comprises a keypad assembly comprising a base pad adapted to support a plurality of keys, the plurality of keys comprising a plurality of first keys and a plurality of second keys, wherein the plurality of first keys and the plurality of second keys are arranged on the base pad, and wherein the plurality of second keys are defined by horizontal center lines and vertical center lines of the plurality of first keys. The mobile station also comprises a body casing coupled to the keypad assembly, comprising a common key hole, the common key hole having a size that corresponds to an area where the plurality of first keys and the plurality of second keys are arranged, the keypad assembly positioned in the common key hole such that the plurality of first and second keys is exposed to the outside through the common key hole.

The mobile station may further comprise a main board coupled to the body casing, the main board comprising dome switches that correspond to the plurality of first and second keys, the dome switches mounted in the body casing such that the dome switches face the plurality of first and second keys. The keypad assembly may further comprise fixing holes at both edges thereof, and fixing protrusions inserted into the fixing holes to prevent deformation of the keypad assembly. The base pad may further comprises a plurality of adjustment keys and wherein a gap exists between the plurality of first keys and second keys and wherein the body casing comprises adjustment key holes adapted to expose the adjustment keys to the outside. The keypad assembly may further comprise a strength reinforcing plate coupled to the base pad, adapted to mechanically strengthen the keypad assembly. The plurality of second keys may be further defined by outer perimeters of the plurality of first keys.

In yet another embodiment, a mobile station comprises a body casing and a plurality of keys exposed to the outside of the body casing, wherein the plurality of keys are not separated from each other by a frame of the body casing.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 3:
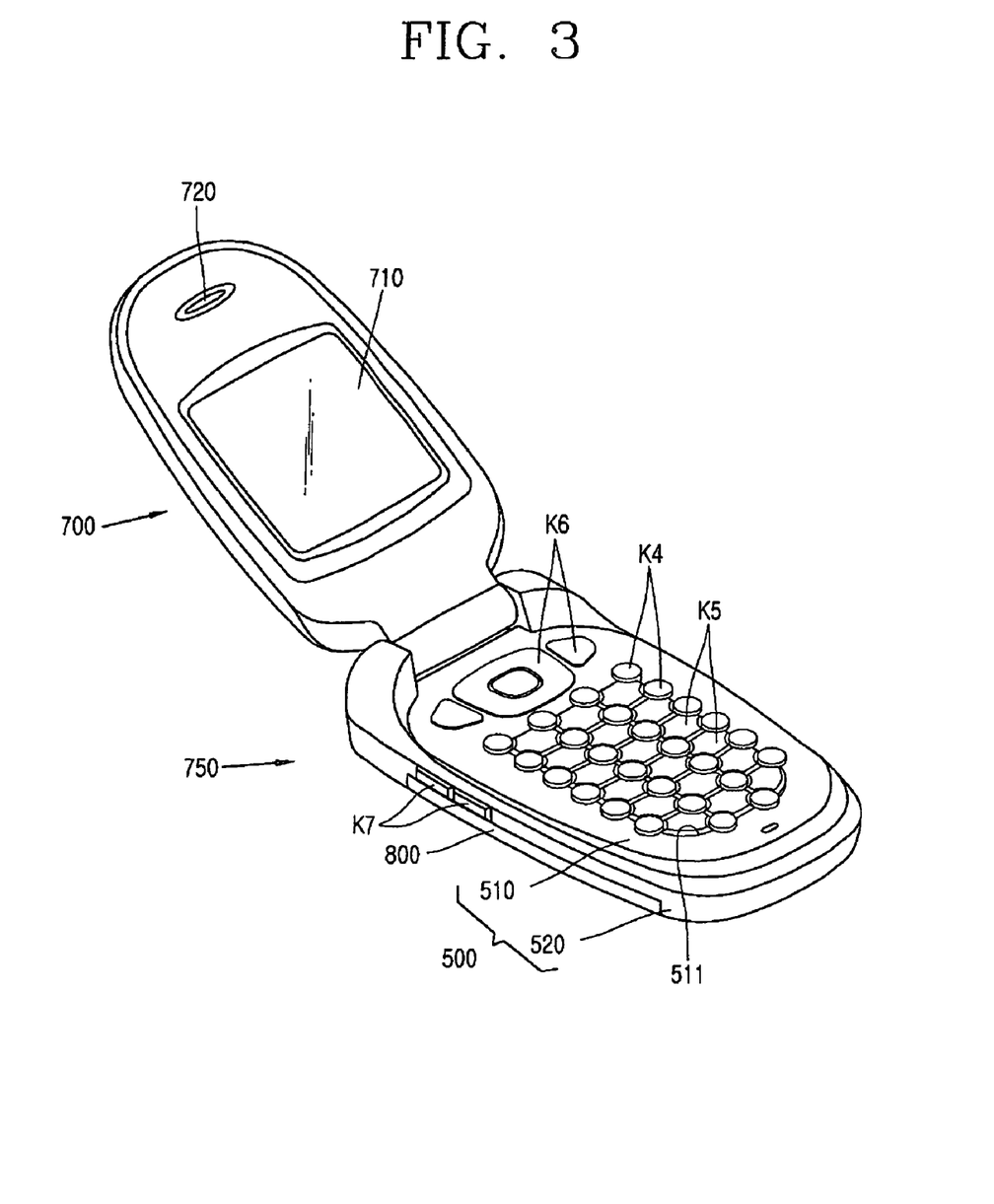
FIG. 3 is a diagram illustrating a perspective view of a folding type mobile station having a keypad assembly, according to a first embodiment of the present invention.
Figure 4:
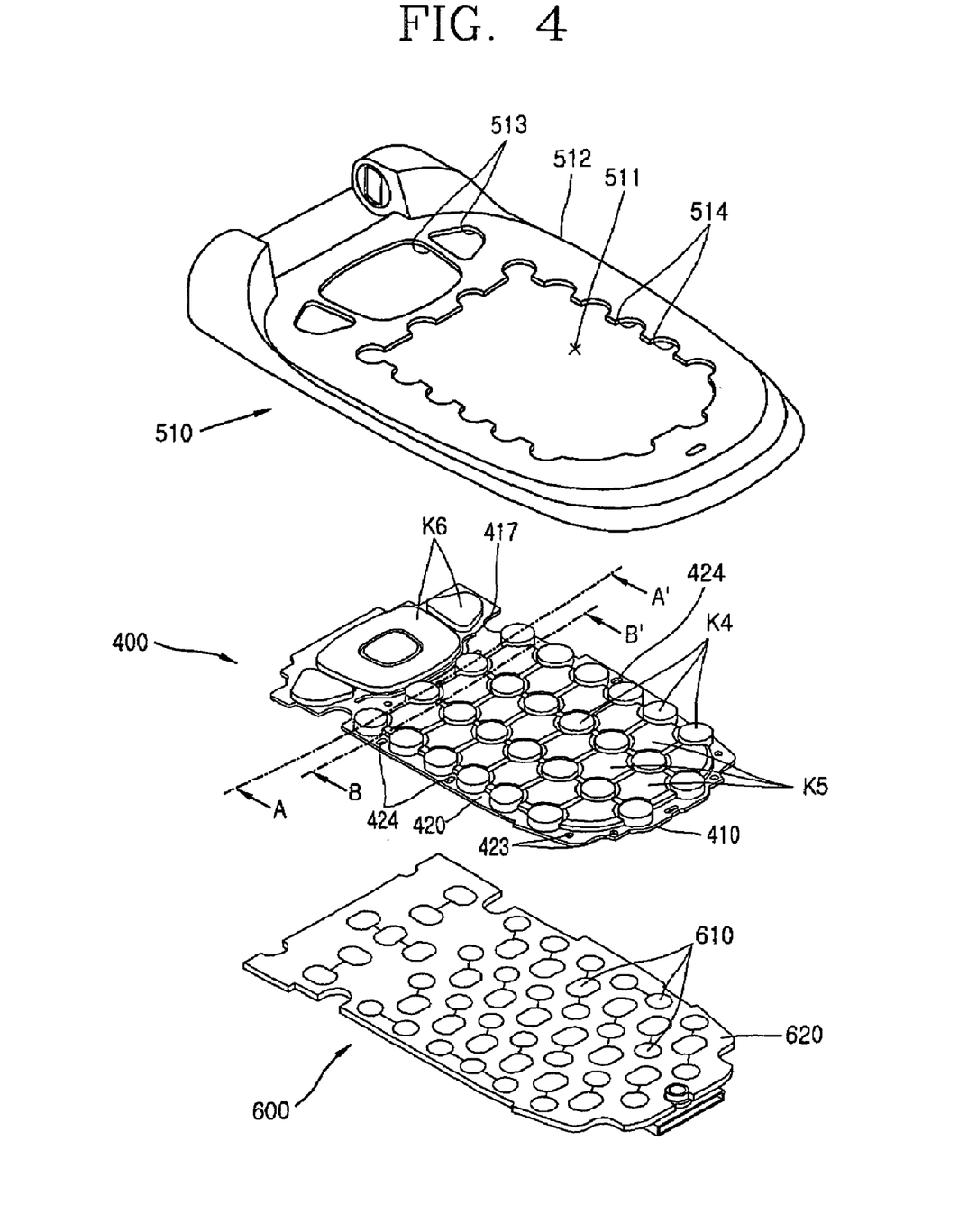
FIG. 4 is a diagram illustrating a disassembled perspective view of the mobile station having a keypad assembly, according to the first embodiment of the present invention.
Figure 5:
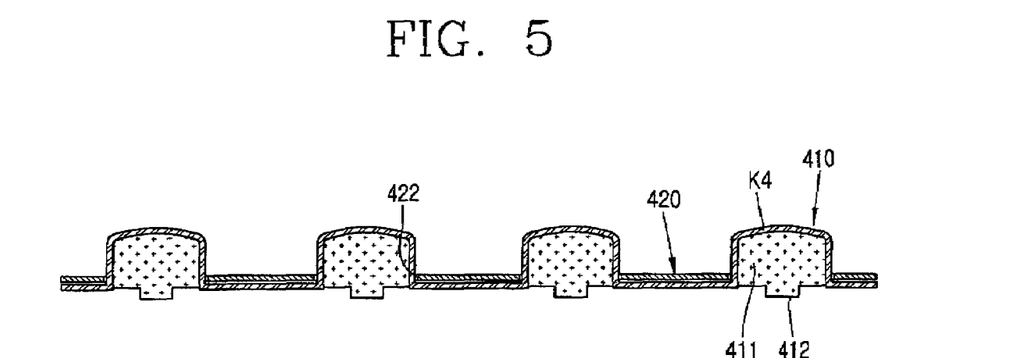
FIGS. 5 and 6 are diagrams illustrating sectional views of the keypad assembly, according to various embodiments of the present invention.
Figure 6:
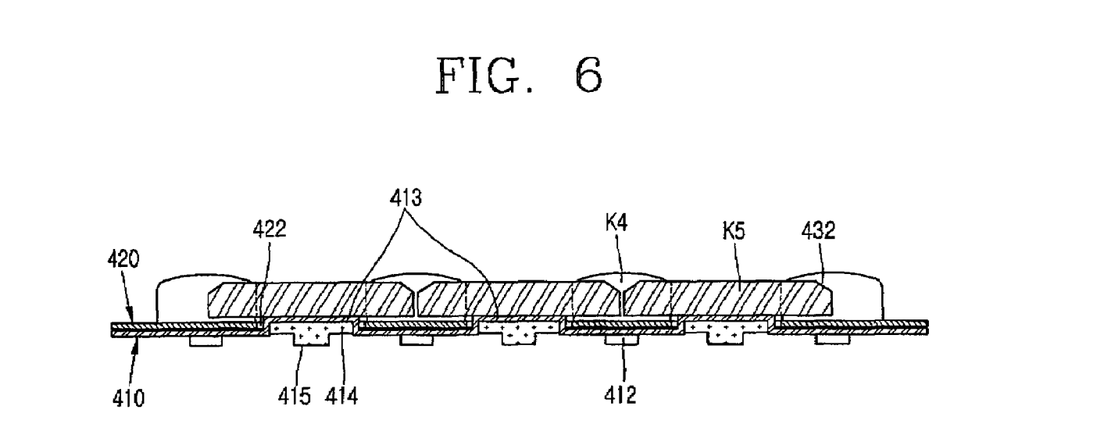

A keypad assembly for a mobile station is described below. FIG. 3 is a diagram illustrating a perspective view of a folding type mobile station having a keypad assembly, according to a first embodiment of the present invention. FIG. 4 is a diagram illustrating a disassembled perspective view of the mobile station having a keypad assembly, according to the first embodiment of the present invention. FIGS. 5 and 6 are diagrams illustrating sectional views of the keypad assembly, according to various embodiments of the present invention. As such, FIG. 5 illustrates a sectional view taken along line A-A' of FIG. 4, and FIG. 6 illustrates a sectional view taken along line B-B' of FIG. 4.

Referring to FIGS. 3-6, a mobile station 750 includes a keypad assembly 400 in which first keys K4 and second keys K5 are arranged on a base pad 410 (see FIGS. 3-4). The mobile station 750 also includes a body casing 500 that has a common key hole 511 with a size corresponding to that of an area where the first keys K4 and the second keys K5 are arranged and also has the keypad assembly 400 therein so that the first keys K4 and the second keys K5 may be exposed to outside through the common key hole 511. The mobile station 750 also includes a main board 600 having dome switches 610 corresponding to the first keys K4 and the second keys K5 and mounted in the body casing 500 so that the dome switches 610 may be positioned to face the first keys K4 and the second keys K5 (see FIG. 4). The mobile station 750 also includes a folder 700 that is hinge-coupled to the body casing 500 (see FIG. 3). The body casing 500, the main board 600, and the keypad assembly 400 constitute the mobile station body (MB) (e.g., the mobile station 750) (see FIGS. 3-4).

The body casing 500 includes a front case 510 and a rear case 520 coupled to the front case 510. The front case 510 and the rear case 520 may be separated by a space. The front case 510 includes a case body 512. The common key hole 511 is formed in the case body 512. Adjustment keys 513 are formed in the case body 512 at a certain distance from the common key hole 511. The common key hole 511 is formed at a surface of the case body 512 that faces the folder 700 and may have a size that is larger than ⅔ of the respective surface of the case body 512. The adjustment key holes 513 are positioned at an upper side of the common key hole 511.

The keypad assembly 400 includes the base pad 410. The first keys K4 are arranged on the base pad 410 and the second keys K5 are arranged at each unit region of the base pad 410 defined by center lines of horizontal rows (e.g., horizontal center lines) of the first keys K4 and center lines of vertical columns (e.g., vertical center lines) of the first keys K4, respectively. The second keys K5 have a shape that corresponds to the shape of each unit region. The keypad assembly 400 also includes a strength reinforcing plate 420 to reinforce structural integrity of the keypad assembly 400. The strength reinforcing plate 420 is preferably coupled between the base pad 410 and the second keys K5.

The base pad 410 may be formed of a flexible material, such as polyurethane. The first keys K4 are arranged to have horizontal rows and vertical columns on the base pad 410. A gap may exist between the first keys K4 and the base pad 410. The first keys K4 may have a constant height and a sectional surface with a circular shape. An upper surface of the first key K4 may preferably have a convex curved shape.

Figure 7:
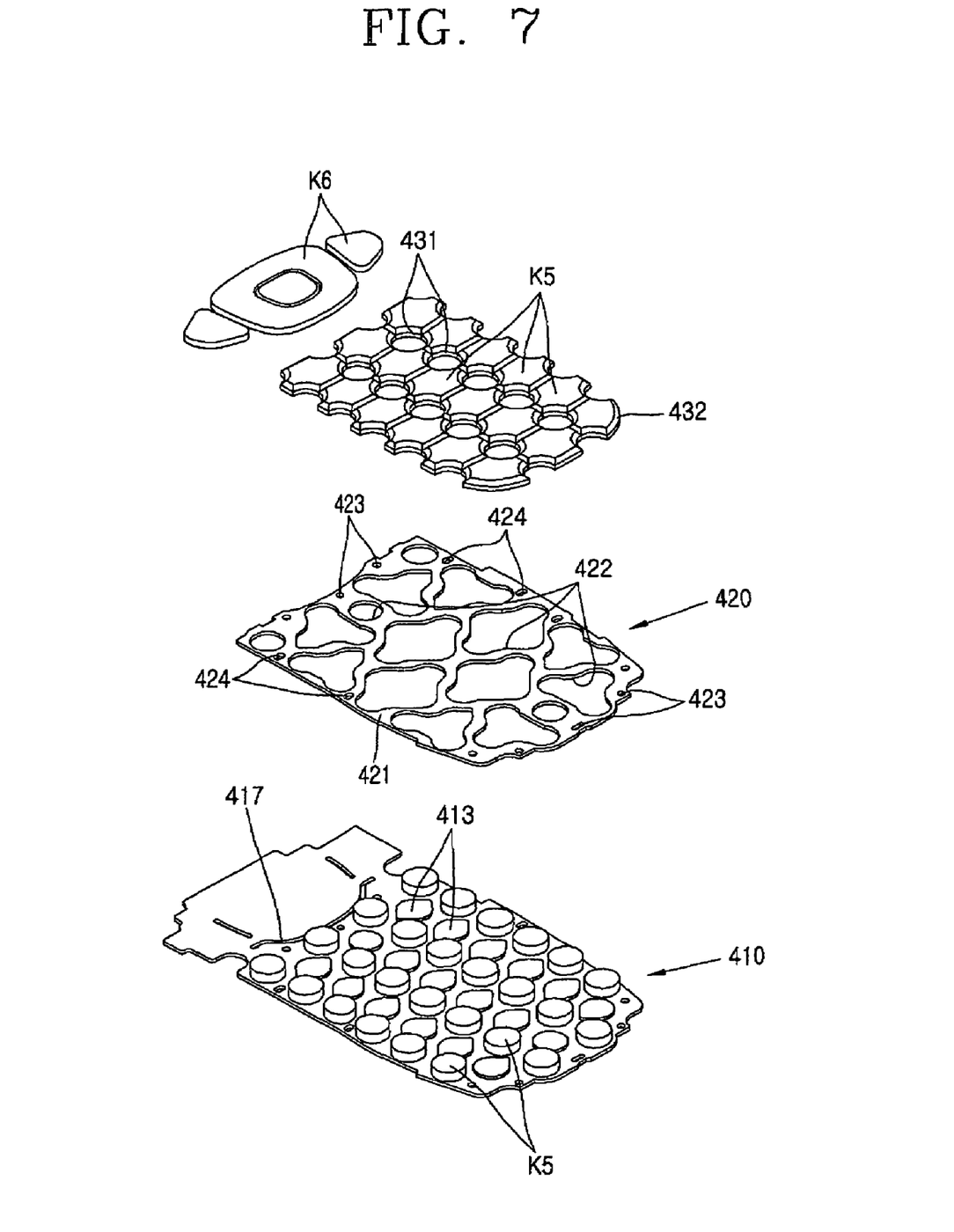
FIG. 7 is a diagram illustrating a disassembled perspective view of the keypad assembly, according to an embodiment of the present invention.
Figure 8:
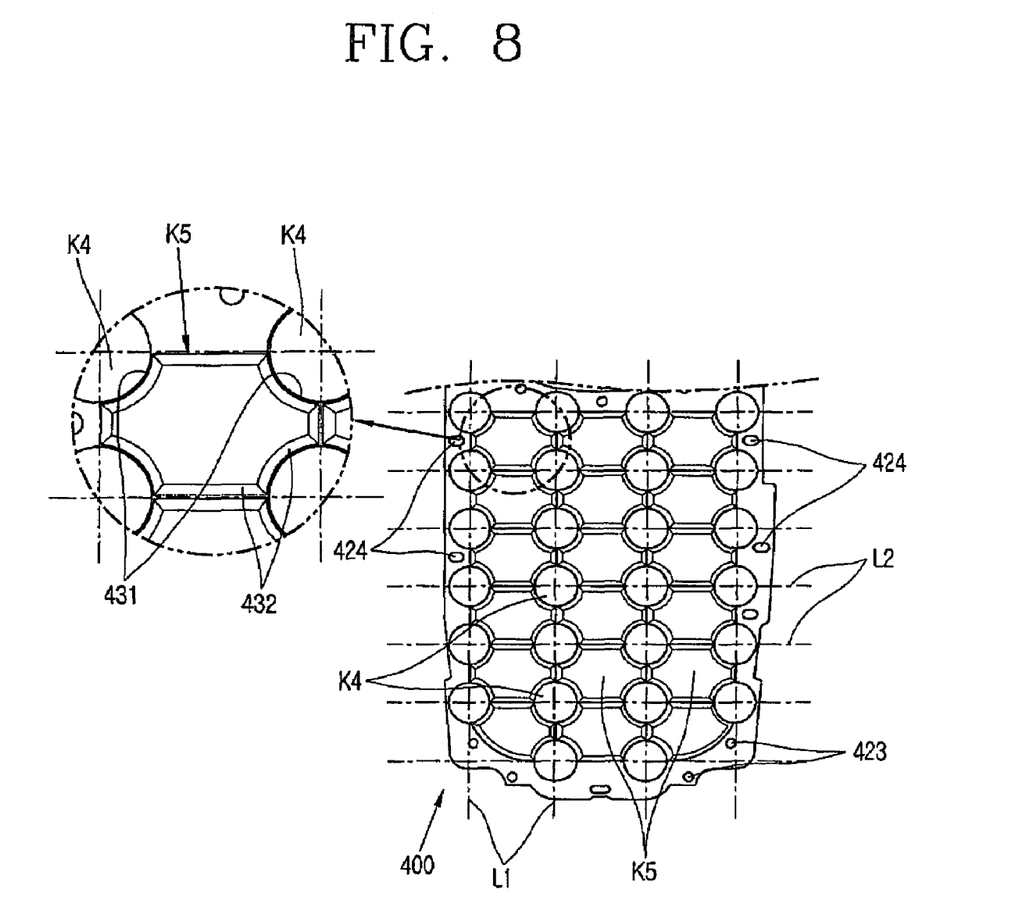
FIG. 8 is a diagram illustrating a plane view of the keypad assembly, according to an embodiment of the present invention.
Figure 9:
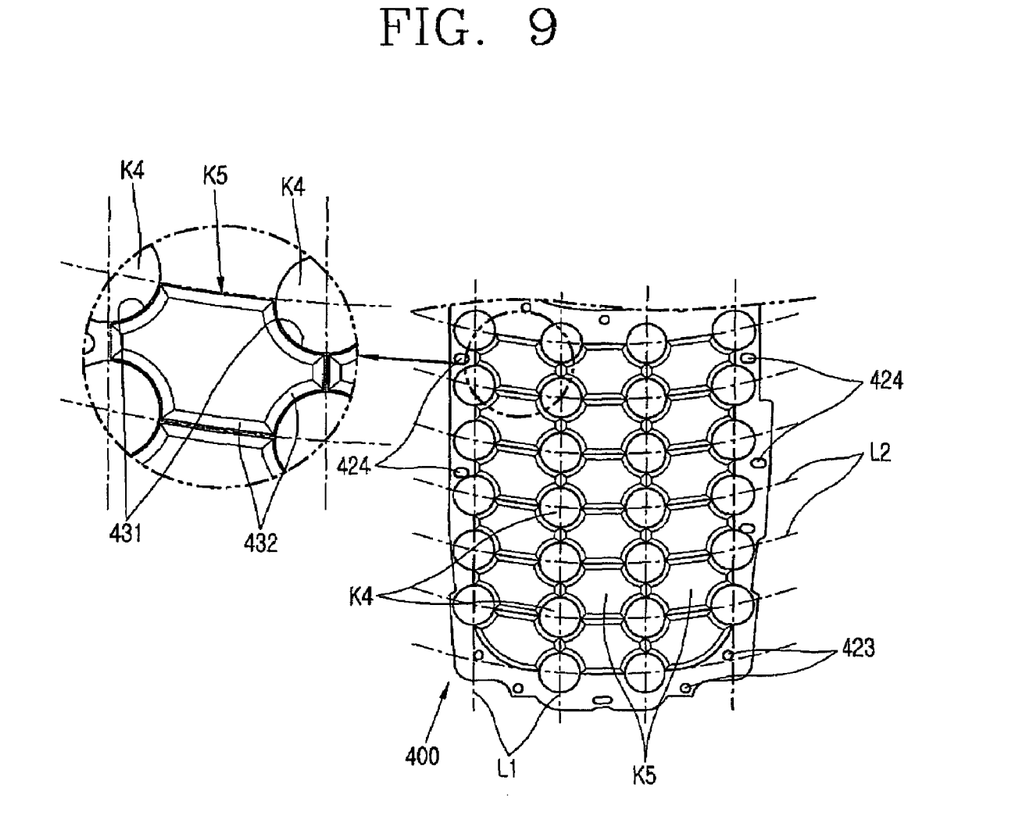
FIG. 9 is a diagram illustrating a plane view of arrangement of first keys of the keypad assembly, according to an embodiment of the present invention.

FIG. 7 is a diagram illustrating a disassembled perspective view of the keypad assembly, according to an embodiment of the present invention. FIG. 8 is a diagram illustrating a plane view of the keypad assembly, according to an embodiment of the present invention. Referring to FIG. 8, the horizontal rows of the first keys K4 and the vertical columns of the first keys K4 may be arranged in substantially straight lines. FIG. 9 is a diagram illustrating a plane view of arrangement of first keys of the keypad assembly, according to an embodiment of the present invention. Referring to FIG. 9, the horizontal rows of the first keys K4 may be arranged in curved lines and the vertical columns of the first keys K4 arranged in straight lines.

Referring to FIGS. 7-9, the second keys K5 are arranged to fill regions of the base pad 410 where the first keys K4 are not positioned. The second keys K5 are formed as grooves 431 having a circular arc shape at each edge of a rectangle. The groove 431 having a circular arc shape substantially corresponds to ¼ of a circle. A curvature radius of the groove 431 is similar to a curvature radius of the first key K4. Edges of the second keys K5 have inclined surfaces 432 with a chamfered form. Upper surfaces of the second keys K5 preferably have a convex curved shape.

The second keys K5 are positioned between four first keys K4 that are arranged as a rectangular shape. If a second key K5 is not surrounded by four of the first keys K4 arranged in a rectangular shape, such as at a lower side of the base pad 410, the second keys K5 are formed to correspond to the shape of the surrounding first keys K4.

The second keys K5 are arranged in regions of the base pad 410 where the first keys K4 are not positioned. The first keys K4 are positioned at the edge of the base pad 410. The height of the first keys K4 may be different from the height of the second keys K5. Furthermore, the first keys K4 may preferably be raised higher than the second keys K5. The height difference between the first keys K4 and the second keys K5 may preferably be more than 0.6 mm. Alternatively, the height of the first keys K4 may be the same as the height of the second keys K5.

An interval between each center line LI of the vertical columns of the first keys K4 may preferably be 10.8 mm, and an interval between each center line L2 of the horizontal rows of the first keys K4 may preferably be 7.4 mm (see FIGS. 8-9). If a diameter of the first key K4 is less than 5 mm, it may be difficult for the user to accurately press the first key K4. Therefore, the diameter of the first key K4 may preferably be more than 5.1 mm.

The first keys K4 are formed as the base pad 410 is partially embossed. Filling members 411 that have a shape corresponding to the embossed parts of the base pad 410 are respectively inserted into the embossed parts and attached thereto. The filling member 411 is preferably formed of a transparent material. The filling member 411 includes a contact protrusion 412 formed at or near the middle of the filling member 411 to be positioned at or near the middle of the first key K4. When the keypad assembly 400 is coupled to the body casing 500, the contact protrusion 412 contacts the dome switch 610 of the main board 600. The filling member 411 may be integrally formed with the base pad 410.

Key supporting protrusions 413 are formed in the base pad 410 where the second keys K5 are positioned. The height of the key supporting protrusions 413 may be less than the height of the first keys K4. The key supporting protrusions 413 protrude from the base pad 410 as an embossing form. An additional filling member 414 is inserted into the embossed part to be attached thereto (see FIG. 6). The filling member 414 includes a contact protrusion 415 formed at or near the middle of the filling member 414 to be positioned at or near the middle of the key supporting protrusion 413. When the keypad assembly 400 is coupled to the body casing 500, the contact protrusion 415 contacts the dome switch 610 of the main board 600. The filling member 414 attached to the key supporting protrusion 413 may be integrally formed with the base pad 410. The height difference between the height of the key supporting protrusion 413 and the height of the second key K5 may preferably be less than the height of the first key K4.

The strength reinforcing plate 420 includes a plate portion 421, which may be formed as a thin plate, a plurality of through holes 422 formed in the plate portion 421, and a plurality of assembly holes 423 formed at the edge of the plate portion 421 and coupled to the body casing 500. The through holes 422 are formed such that at least one first key K4 and one key supporting protrusion 413 are positioned therein. The strength reinforcing plate 420 is preferably formed of metal. The strength reinforcing plate 420 is coupled to the base pad 410 such that the first key K4 and the key supporting protrusion 413 are positioned in the through hole 422. The second keys K5 are respectively attached to the key supporting protrusions 413 of the base pad 410. The base pad 410 and the strength reinforcing plate 420 may be fixedly coupled to each other.

Figure 10:
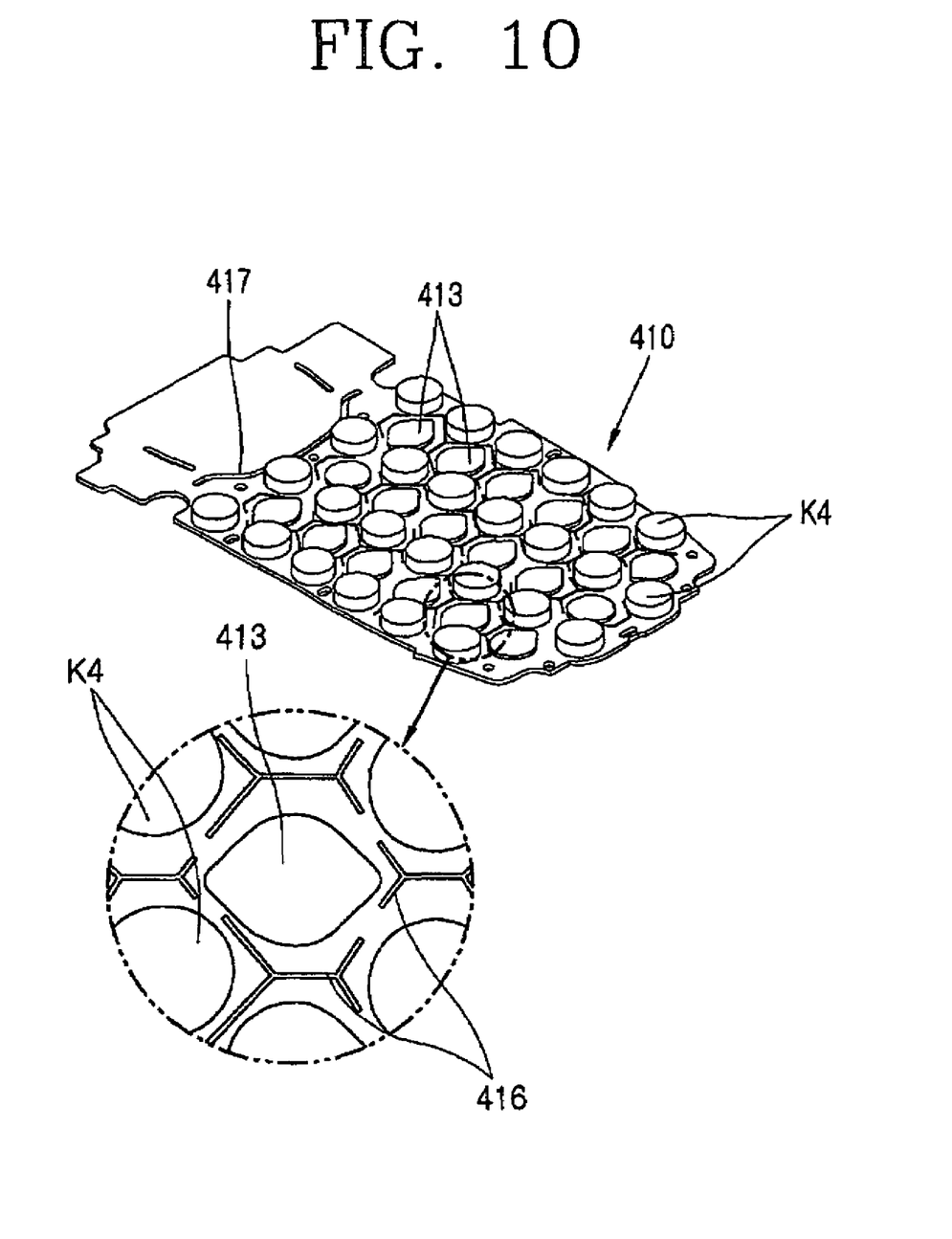
FIGS. 10 and 11 are diagrams illustrating perspective views of a base pad of the keypad assembly, according to various embodiments of the present invention.
Figure 11:
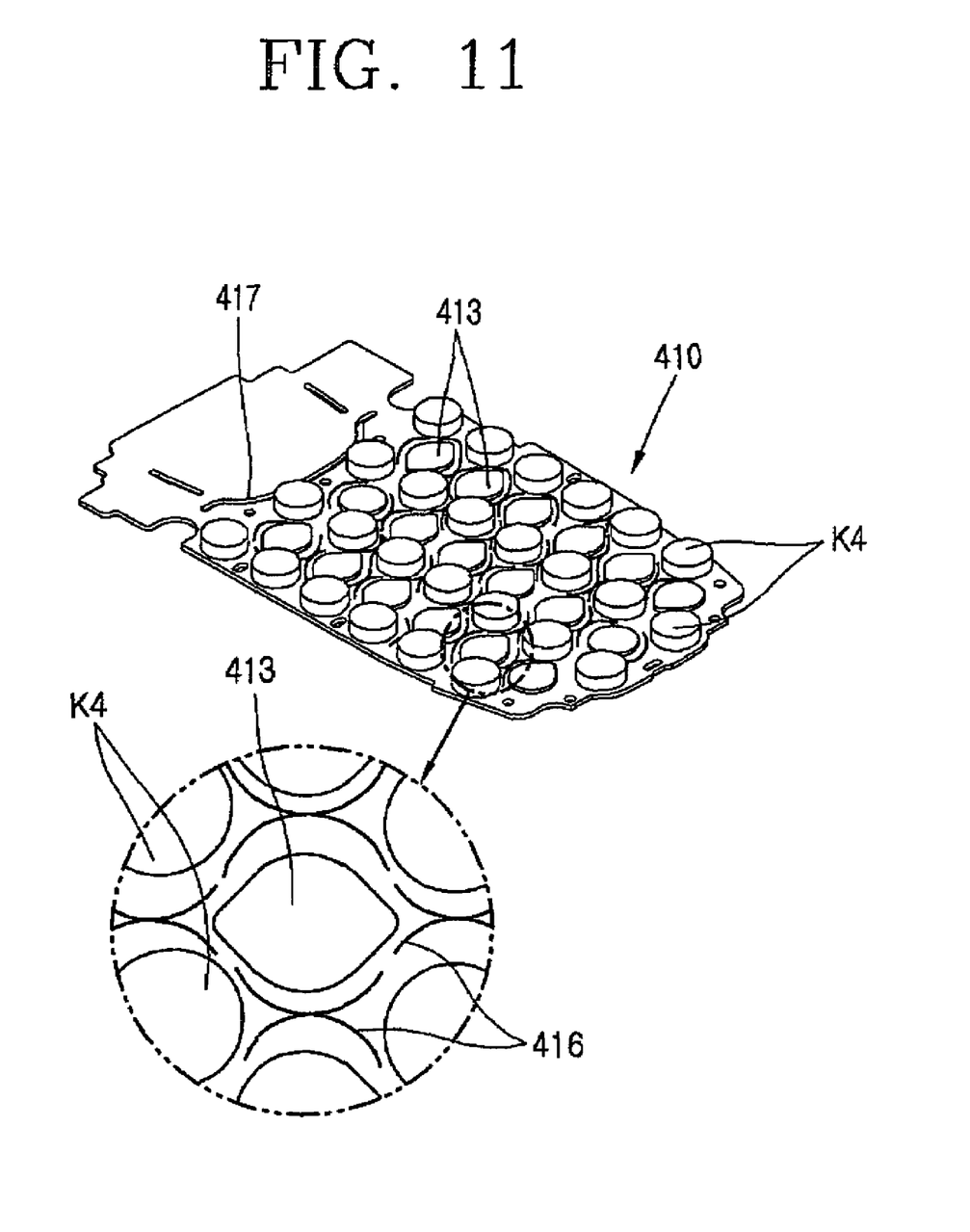

FIGS. 10 and 11 are diagrams illustrating perspective views of the base pad 410 of the keypad assembly, according to various embodiments of the present invention.

Referring to FIG. 10, slits 416 are formed on the base pad 410 to prevent an overlap between the first keys K4, between the first keys K4 and the second keys K5, and between the second keys K5 when the first keys K4 or the second keys K5 are pressed. The slits 416 have a connected form of a plurality of straight slits at an interface between the first keys K4 and the key supporting protrusions 413.

Referring to FIG. 11, another embodiment of the slits 416 is shown. The slits 416 have a connected form of two curved slits at an interface between the first keys K4 and the key supporting protrusions 413.

Referring again to FIG. 3, the first keys K4 are preferably constituted with 26 keys, and alphabets are arranged on the 26 first keys K4. The alphabets may be arranged from left to right or top to bottom, for example.

Numerals, such as Arabic numerals, are arranged on at least some of the second keys K5. The adjustment keys K6 are attached to an upper side of the base pad 410 and have a certain gap separating from the region where the first keys K4 and the second keys K5 are positioned. The region occupied by the adjustment keys K6 is preferably less than ¼ of the region occupied by the first keys K4 and the second keys K5. The adjustment keys are preferably composed of a multi-key, and/or one or more adjustment keys.

The base pad 410 includes a curved slit between the region where the adjustment keys K6 are positioned and the region where the first keys K4 and the second keys K5 are positioned to prevent the keys K4, K5, and K6 from overlapping.

Figure 12:
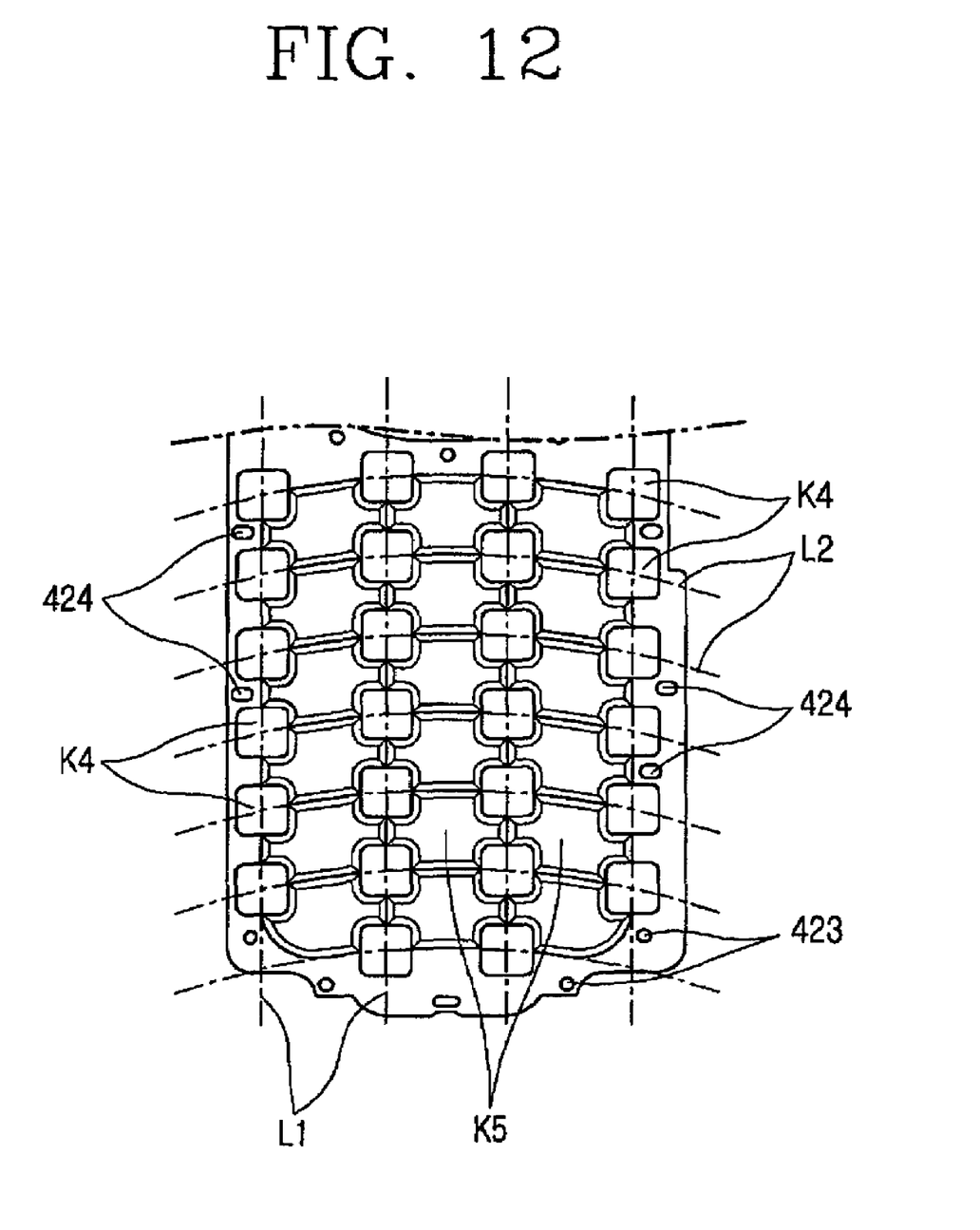
FIG. 12 is a diagram illustrating a plane view of a keypad assembly, according to another embodiment of the present invention.

FIG. 12 is a diagram illustrating a plane view of the keypad assembly 400, according to another embodiment of the present invention.

Referring to FIG. 12, the first keys K4 formed on the base pad 410 have a sectional surface with a rectangular shape.

The second keys K5 are attached to each unit region defined by center lines L1 of vertical columns of the first keys K4 and center lines L2 of horizontal rows of the first keys K4. The second keys K5 are constructed as a groove corresponding to ¼ of the first key K4, and are respectively formed at each edge of a rectangular shape.

Referring again to FIG. 4, the main board 600 may include a substrate 620 having a certain shape, components mounted at one surface of the substrate 620, and dome switches 610 mounted at another surface of the substrate 620.

Referring again to FIGS. 3-4, the keypad assembly 400 is mounted at the body casing 500 so that the first keys K4 and the second keys K5 may be exposed to outside through the common key hole 511 of the front case 510, and opposite surfaces of the first keys K4 and the second keys K5 contact the dome switches 610 of the main board 600. That is, the contact protrusions 412 and 415 respectively positioned at the opposite surfaces of the first keys K4 and the second keys K5 contact the dome switches 610 of the main board.

A plurality of position grooves 514 for positioning outer first keys K4 are formed at an inner wall of the common key hole 511 of the body casing 500. Side keys K7 are provided at both side surfaces of the body casing 500.

Figure 13:
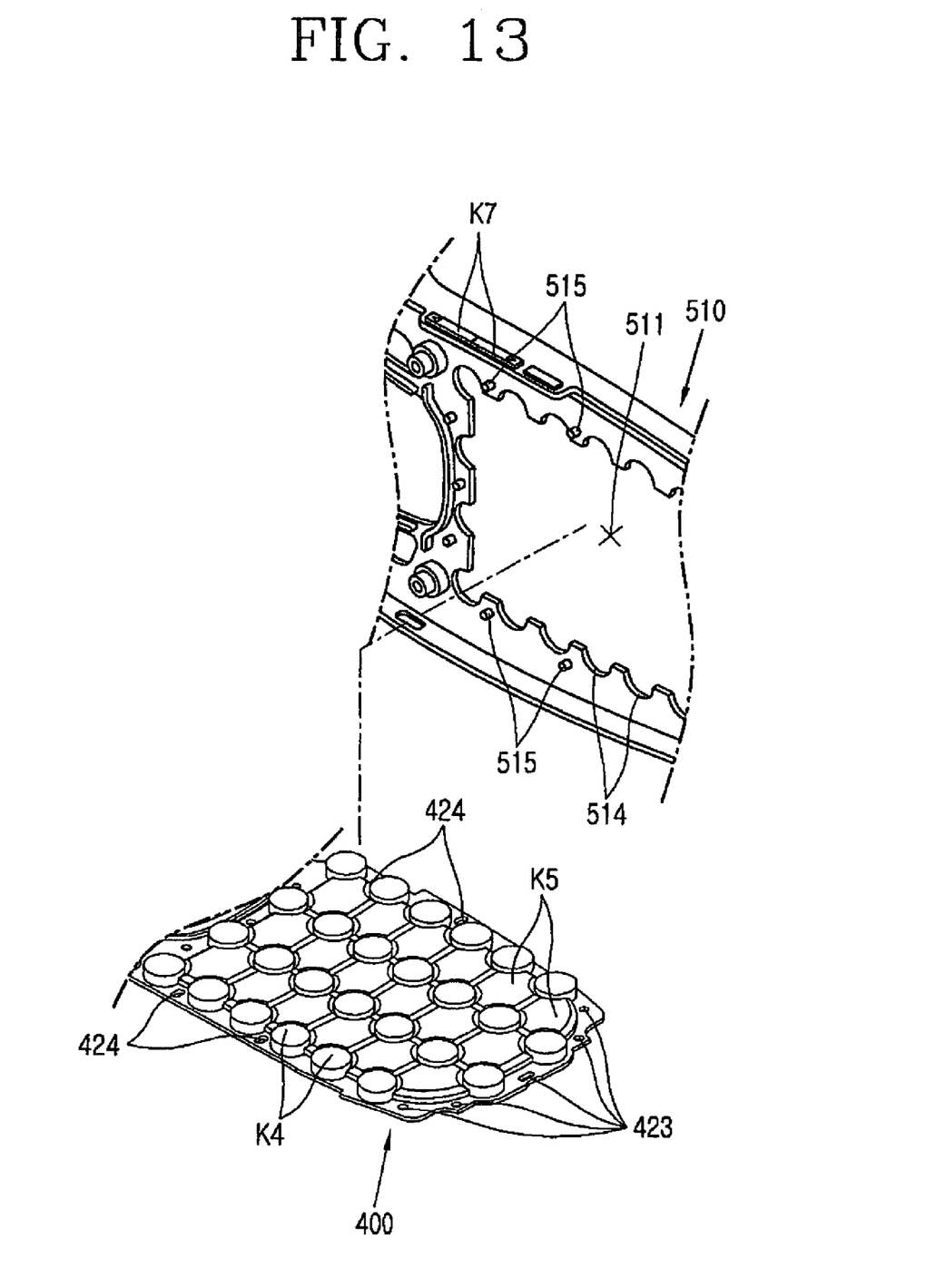
FIG. 13 is a diagram illustrating a disassembled perspective view of the keypad assembly and front case of the mobile station, according to an embodiment of the present
Figure 14:
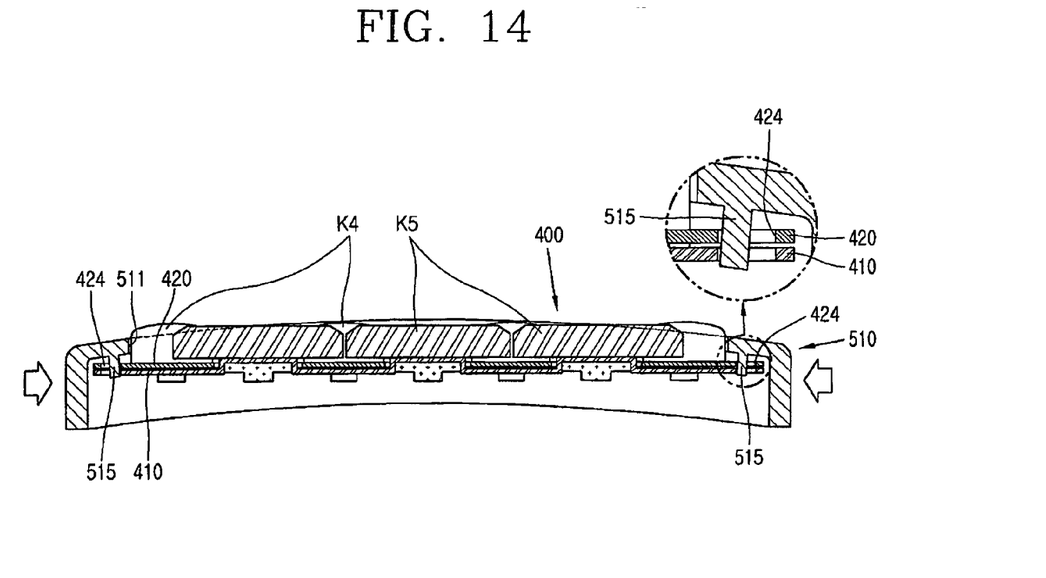
FIG. 14 is a diagram illustrating a sectional view of the mobile station, according

FIG. 13 is a diagram illustrating a disassembled perspective view of the keypad assembly and front case of the mobile station, according to an embodiment of the present invention. FIG. 14 is a diagram illustrating a sectional view of the mobile station, according to an embodiment the present invention.

Referring to FIGS. 13 and 14, to prevent the keypad assembly 400 from bending when the side keys K7 are pressed, fixing holes 424 are formed at both edges of the strength reinforcing plate 420. Furthermore, fixing protrusions 515 inserted into the fixing holes 424 of the strength reinforcing plate 420 are formed at an inner wall of the body casing 500. The fixing holes 424 are formed in the base pad 410 of the keypad assembly 400 to correspond to the strength reinforcing plate 420. The front case 510 and the rear case 520 of the body casing 500 are coupled to each other by a plurality of screws.

Operations of the keypad assembly for a mobile station are described below. In the mobile station having the keypad assembly, to receive a call from another party, the adjustment key K2 or the second key K5 is pressed to execute the call. To initiate a call to another party, the second keys K5 are pressed to input a phone number and the adjustment key K6 is pressed to execute the call. Input signals (e.g., numbers, characters) are previously assigned to the first keys K4, the second keys K5, the adjustment keys K6, and the side keys K7. The first keys K4 and the second keys K5 are also utilized to access the Internet or send a text message using the mobile station having the keypad assembly.

In one embodiment, a keypad assembly for a mobile station comprises a base pad adapted to support a plurality of keys, the plurality of keys comprising a plurality of first keys and a plurality of second keys. The keypad assembly also comprises the plurality of first keys and the plurality of second keys arranged on the base pad, the plurality of second keys defined by horizontal center lines and vertical center lines of the plurality of first keys.

The plurality of second keys may be further defined by outer perimeters of the plurality of first keys. An alphabetic character may be assigned to each of the plurality of first keys. A numeral may be assigned to at least one of the plurality of second keys.

The keypad assembly may further comprise a strength reinforcing plate coupled to the base pad, adapted to mechanically strengthen the keypad assembly. The strength reinforcing plate may be positioned between the base pad and the plurality of second keys. The strength reinforcing plate may comprise a plurality of assembly holes at an edge thereof, and a plurality of through holes to house a first key of the plurality of first keys and a second key of the plurality of second keys. The strength reinforcing plate may be formed of metal.

At least one of the plurality of first keys may have a horizontal circular surface and wherein four edges of at least one of the plurality of second keys are curved surfaces that correspond to a curvature of at least one of the plurality of first keys. A height of the plurality of first keys may be different from a height of the plurality of second keys. The base pad may comprise contact protrusions at one surface thereof, adapted to correspond to the plurality of first keys. The plurality of first keys may be integrally formed with the base pad. The plurality of first keys may be formed of a transparent material.

The keypad assembly may further comprise key supporting protrusions formed on the base pad, having a height adapted to correspond to the plurality of second keys, wherein the plurality of second keys are respectively attached to the key supporting protrusions. The base pad may further comprise slits adapted to prevent overlap between the plurality of first keys and the plurality of second keys. The base pad may be formed of polyurethane. The base pad may further comprise adjustment keys spaced apart from the plurality of first keys and the plurality of second keys.

In another embodiment, a mobile station comprises a keypad assembly comprising a base pad adapted to support a plurality of keys, the plurality of keys comprising a plurality of first keys and a plurality of second keys, wherein the plurality of first keys and the plurality of second keys are arranged on the base pad, and wherein the plurality of second keys are defined by horizontal center lines and vertical center lines of the plurality of first keys. The mobile station also comprises a body casing coupled to the keypad assembly, comprising a common key hole, the common key hole having a size that corresponds to an area where the plurality of first keys and the plurality of second keys are arranged, the keypad assembly positioned in the common key hole such that the plurality of first and second keys is exposed to the outside through the common key hole.

The mobile station may further comprise a main board coupled to the body casing, the main board comprising dome switches that correspond to the plurality of first and second keys, the dome switches mounted in the body casing such that the dome switches face the plurality of first and second keys. The keypad assembly may further comprise fixing holes at both edges thereof, and fixing protrusions inserted into the fixing holes to prevent deformation of the keypad assembly. The base pad may further comprises a plurality of adjustment keys and wherein a gap exists between the plurality of first keys and second keys and wherein the body casing comprises adjustment key holes adapted to expose the adjustment keys to the outside. The keypad assembly may further comprise a strength reinforcing plate coupled to the base pad, adapted to mechanically strengthen the keypad assembly. The plurality of second keys may be further defined by outer perimeters of the plurality of first keys.

In yet another embodiment, a mobile station comprises a body casing and a plurality of keys exposed to the outside of the body casing, wherein the plurality of keys are not separated from each other by a frame of the body casing.

According to the present invention, one common key hole 511 is formed in the body casing 500 and the first keys K4 and the second keys K5 are exposed to outside through the common key hole 511. Therefore, an additional frame for forming key holes into which the keys K4 and K5 are respectively inserted does not need to be provided at the body casing 500. Such construction may increase the usable area for arrangement of the keys K4 and K5 and thereby increase the number of the keys K4 and K5. Furthermore, since an additional frame for forming key holes into which the keys K4 and K5 are respectively inserted is not provided at the body casing 500, structural integrity of the body casing 500 may be increased. Additionally, as the number of the keys is increased, characters for composing a message and/or Arabic numerals for composing a telephone number may be arranged on each key one by one, thereby enhancing the user's convenience.

Furthermore, the fixing protrusions 515 formed at the body casing 500 are respectively inserted into the fixing holes 424 formed at the keypad assembly 400. Accordingly, when an external force is applied to the keypad assembly 400 from the side surface, the force is transmitted to the body casing to prevent the keypad assembly 400 from bending and mechanically strengthen the keypad assembly 400. Additionally, since the slits 416 are formed around the first keys K4 and the second keys adjacent keys are prevented from overlapping when the first keys K4 and/or the second keys K5 are pressed, thereby preventing undesired operation of the mobile station.

Thus the present invention may allow the structural integrity of the body casing to be increased and also allow for many keys to be arranged on the keypad assembly. Such construction may not only prevent the mobile station from being damaged, but may also provide more convenient operation to the user.

It will be apparent to those skilled in the art that various modifications and variations may be made in the present invention without departing from the spirit or scope of the inventions. Thus it is intended that the present invention covers the modifications and variations of this invention provided they come within the scope of the appended claims and their equivalents.

What is claimed is:

1. A keypad assembly for a mobile station, the keypad assembly comprising:
    a base pad configured to support a plurality of first keys and a plurality of second keys, and having contact protrusions corresponding to the plurality of first keys, the contact protrusions disposed on one surface of the base pad to correspond to dome switches of a circuit board on which the base pad is disposed,
    the plurality of first keys and the plurality of second keys arranged on the base pad, the plurality of second keys defined by horizontal center lines and vertical center lines of the plurality of first keys;
    key supporting protrusions protruding toward the second keys in the base pad; and
    a strength reinforcing plate coupled to the base pad to be positioned between the base pad and the second keys, and configured to mechanically strengthen the keypad assembly,
    wherein the base pad comprises a plurality of slits configured to prevent overlapping first keys with first keys, first keys with second keys, and second keys with second keys,
    wherein the slits are formed from a plurality of straight portions or a plurality of curved portions,
    wherein the strength reinforcing plate is formed of a different material from the base pad, and comprises a plurality of through holes, and
    wherein the key supporting protrusions are positioned inside the plurality of through holes such that the second keys are respectively attached thereto.

2. The keypad assembly of claim 1, wherein the plurality of second keys are further defined by outer perimeters of the plurality of first keys.

3. The keypad assembly of claim 1, wherein an alphabetic character is assigned to each of the plurality of first keys.

4. The keypad assembly of claim 1, wherein a numeral is assigned to at least one of the plurality of second keys.

5. The keypad assembly of claim 1, wherein the strength reinforcing plate comprises a plurality of assembly holes at an edge thereof, and the plurality of through holes to house a first key of the plurality of first keys and a second key of the plurality of second keys.

6. The keypad assembly of claim 1, wherein the strength reinforcing plate is formed of metal.

7. The keypad assembly of claim 1, wherein at least one of the plurality of first keys has a horizontal circular surface and wherein four edges of at least one of the plurality of second keys are curved surfaces that correspond to a curvature of at least one of the plurality of first keys.

8. The keypad assembly of claim 1, wherein a height of the plurality of first keys is different from a height of the plurality of second keys.

9. The keypad assembly of claim 1, wherein the plurality of first keys are integrally formed with the base pad.

10. The keypad assembly of claim 1, wherein the plurality of first keys are formed of a transparent material.

11. The keypad assembly of claim 1, wherein the key supporting protrusions have a height configured to correspond to the plurality of second keys.

12. The keypad assembly of claim 1, wherein the base pad is formed of polyurethane.

13. The keypad assembly of claim 1, wherein the base pad further comprises adjustment keys spaced apart from the plurality of first keys and the plurality of second keys.

14. A mobile station having a keypad assembly, the mobile station comprising:
- the keypad assembly comprising a base pad adapted to support a plurality of first keys and a plurality of second keys, and having contact protrusions corresponding to the plurality of first and second keys, the contact protrusions disposed on one surface of the base pad to correspond to dome switches of a main board on which the base pad is disposed, wherein the plurality of first keys and the plurality of second keys are arranged on the base pad, and wherein the plurality of second keys are defined by horizontal center lines and vertical center lines of the plurality of first keys, wherein the base pad comprises a plurality of slits configured to prevent overlapping first keys with first keys, first keys with second keys, and second keys with second keys;
- a strength reinforcing plate coupled to the base pad to be positioned between the base pad and the second keys, and configured to mechanically strengthen the keypad assembly, wherein the strength reinforcing plate is formed of a different material from the base pad, and comprises a plurality of through holes;
- key supporting protrusions protruding toward the second keys in the base pad, and positioned inside the plurality of through holes such that the second keys are respectively attached thereto; and
- a body casing coupled to the keypad assembly, comprising a common key hole, the common key hole having a size that corresponds to an area where the plurality of first keys and the plurality of second keys are arranged, the keypad assembly positioned in the common key hole such that the plurality of first and the plurality of second keys are exposed to the outside through the common key hole,
- wherein the slits are formed from a plurality of straight portions or a plurality of curved portions.

15. The mobile station of claim 14, wherein the main board is coupled to the body casing, and the dome switches correspond to the plurality of first and second keys, the dome switches mounted in the body casing such that the dome switches face the plurality of first and second keys.

16. The mobile station of claim 14, wherein the keypad assembly further comprises fixing holes at both edges thereof, and fixing protrusions inserted into the fixing holes to prevent deformation of the keypad assembly.

17. The mobile station of claim 14, wherein the base pad comprises a plurality of adjustment keys, wherein a gap exists between the plurality of first keys and the plurality of second keys, and wherein the body casing comprises adjustment key holes adapted to expose the adjustment keys to the outside.

18. The mobile station of claim 14, wherein the plurality of second keys are further defined by outer perimeters of the plurality of first keys.

* * * * *